United States Patent
Kim et al.

(10) Patent No.: US 10,958,381 B2
(45) Date of Patent: Mar. 23, 2021

(54) UPLINK SIGNAL TRANSMISSION METHOD AND USER EQUIPMENT, AND UPLINK SIGNAL RECEPTION METHOD AND BASE STATION

(71) Applicant: LG ELECTRONICS INC., Seoul (KR)

(72) Inventors: Eunsun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 16/336,864

(22) PCT Filed: Sep. 25, 2017

(86) PCT No.: PCT/KR2017/010538
§ 371 (c)(1),
(2) Date: Mar. 26, 2019

(87) PCT Pub. No.: WO2018/056775
PCT Pub. Date: Mar. 29, 2018

(65) Prior Publication Data
US 2019/0253193 A1 Aug. 15, 2019

Related U.S. Application Data

(60) Provisional application No. 62/400,072, filed on Sep. 26, 2016.

(51) Int. Cl.
*H04L 1/16* (2006.01)
*H04L 5/00* (2006.01)
(Continued)

(52) U.S. Cl.
CPC .............. *H04L 1/1614* (2013.01); *H04L 1/00* (2013.01); *H04L 1/0003* (2013.01); *H04L 5/00* (2013.01);
(Continued)

(58) Field of Classification Search
CPC .................................................. H04L 1/1614
See application file for complete search history.

(56) References Cited

U.S. PATENT DOCUMENTS

2016/0255654 A1 9/2016 Lin et al.
2018/0192439 A1* 7/2018 Tang .................. H04W 74/006

FOREIGN PATENT DOCUMENTS

WO  WO-2017167198 A1 * 10/2017 ........... H04L 1/1685
WO  WO-2018021819 A1 *  2/2018 ........... H04L 5/0055

OTHER PUBLICATIONS

PCT International Application No. PCT/KR2017/010538, Written Opinion of the International Searching Authority dated Dec. 22, 2017, 18 pages.

(Continued)

*Primary Examiner* — Kodzovi Acolatse
*Assistant Examiner* — Abdeltif Ajid
(74) *Attorney, Agent, or Firm* — Lee Hong Degerman Kang Waimey

(57) ABSTRACT

A base station receives uplink data and a first demodulation reference signal (DMRS) in a physical multiple access (MA) resource, and attempts to decode the uplink data, using the first DMRS. When the base station fails to decode the uplink data, the base station transmits an ACK/NACK for a first MA signature corresponding to the first DMRS among multiple MA signatures. When the ACK/NACK for the first MA signature is a NACK and the received power level of the first DMRS is higher than or equal to a threshold, the base station transmits a MA signature reselection command for (Continued)

the first MA signature together with the ACK/NACK. When the ACK/NACK for the first MA signature is a NACK and the received power level of the first DMRS is lower than the threshold, the base station transmits a MA signature maintenance command for the first MA signature together with the ACK/NACK.

20 Claims, 9 Drawing Sheets

(51) Int. Cl.
     *H04L 1/00*      (2006.01)
     *H04W 52/36*      (2009.01)
(52) U.S. Cl.
     CPC .......... *H04L 5/0048* (2013.01); *H04L 5/0055* (2013.01); *H04W 52/36* (2013.01)

(56) References Cited

OTHER PUBLICATIONS

LG Electronics, et al., "WF on some definition of terminologies for 'autonomous/grant-free/contention-based' MA", 3GPP TSG RAN WG1 Meeting #86, R1-168423, Aug. 2016, 6 pages.
Samsung, "Discussion on grant-free/contention-based non-orthogonal multiple access", 3GPP TSG RAN WG1 Meeting #86, R1-166752, Aug. 2016, 5 pages.
Fujitsu, "DM-RS considerations for UL non-orthogonal multiple access", 3GPP TSG RAN WG1 Meeting #86, R1-166671, Aug. 2016, 3 pages.
NTT Docomo, "Discussion on multiple access for UL mMTC", 3GPP TSG RAN WG1 Meeting #86, R1-167392, Aug. 2016, 9 pages.

* cited by examiner

FIG. 8

| MA signature index | 1 | 2 | 3 | 4 | 5 | 6 | 7 | 8 |
|---|---|---|---|---|---|---|---|---|
| A/N information | A/N | A/N | A/N | A/N | A/N | A/N | A/N | A/N |

UPLINK SIGNAL TRANSMISSION METHOD AND USER EQUIPMENT, AND UPLINK SIGNAL RECEPTION METHOD AND BASE STATION

CROSS-REFERENCE TO RELATED APPLICATIONS

This application is the National Stage filing under 35 U.S.C. 371 of International Application No. PCT/KR2017/010538, filed on Sep. 25, 2017, which claims the benefit of U.S. Provisional Application No. 62/400,072, filed on Sep. 26, 2016, the contents of which are all hereby incorporated by reference herein in their entireties.

TECHNICAL FIELD

The present invention relates to a wireless communication system, and more particularly, to a method and apparatus for transmitting/receiving uplink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting an uplink signal by a user equipment (UE) in a wireless communication system. The method comprises: transmitting uplink data, and a first demodulation reference signal (DMRS) corresponding to a first multiple access (MA) signature, using the first MA signature among a plurality of MA signatures available on a physical MA resource; receiving acknowledgement (ACK)/negative ACK (NACK) information including ACK/NACK for the first MA signature; and performing retransmission of the uplink data when ACK/NACK for the first MA signature is NACK. When ACK/NACK for first MA signature is NACK, the ACK/NACK information may include an MA signature reselection or maintenance command. When the ACK/NACK information includes the MA signature maintenance command, retransmission of the uplink data may use the first MA signature and the first DMRS and, when the ACK/NACK information includes the MA signature reselection command, retransmission of the uplink data may use a second MA signature different from the first MA signature and a second DMRS corresponding to the second MA signature.

In another aspect of the present invention, provided herein is a method of receiving an uplink signal by a base station (BS) in a wireless communication system. The method comprises: receiving uplink data and a first demodulation reference signal (DMRS) on a physical multiple access (MA) resource; attempting to decode the uplink data using the first DMRS; and upon failing to decode the uplink data, transmitting acknowledgement (ACK)/negative ACK (NACK) information including ACK/NACK for a first MA signature corresponding to the first DMRS among a plurality of MA signatures. When ACK/NACK for the first MA signature is NACK and a received power level of the first DMRS is equal to or higher than a threshold, the ACK/NACK information may include an MA signature reselection command for the first MA signature. When ACK/NACK for the first MA signature is NACK and the received power level of the first DMRS is lower than the threshold, the ACK/NACK information may include an MA signature maintenance command for the first MA signature.

In another aspect of the present invention, provided herein is a user equipment (UE) for transmitting an uplink signal in a wireless communication system. The UE includes a radio frequency (RF) unit, and a processor configured to control the RF unit. The processor is configured to: control the RF unit to transmit uplink data, and a first demodulation reference signal (DMRS) corresponding to a first multiple access (MA) signature, using the first MA signature among a plurality of MA signatures available on a physical MA resource; control the RF unit to receive acknowledgement (ACK)/negative ACK (NACK) information including ACK/NACK for the first MA signature; and control the RF unit to perform retransmission of the uplink data when ACK/NACK for the first MA signature is NACK. When ACK/NACK for first MA signature is NACK, the ACK/NACK information may include an MA signature reselection or maintenance command. If the ACK/NACK information includes the MA signature maintenance command, retransmission of the uplink data may use the first MA signature and the first DMRS and, when the ACK/NACK information includes the MA signature reselection command, retransmission of the uplink data may use a second MA signature different from the first MA signature and a second DMRS corresponding to the second MA signature.

In another aspect of the present invention, provided herein is a base station (BS) for receiving an uplink signal in a wireless communication system. The BS includes a radio frequency (RF) unit, and a processor configured to control the RF unit. The processor is configured to: control the RF unit to receive uplink data and a first demodulation reference signal (DMRS) on a physical multiple access (MA) resource; attempt to decode the uplink data using the first DMRS; and upon failing to decode the uplink data, control the RF unit to transmit acknowledgement (ACK)/negative ACK (NACK) information including ACK/NACK for a first MA signature corresponding to the first DMRS among a plurality of MA signatures. When ACK/NACK for the first MA signature is NACK and a received power level of the first DMRS is equal to or higher than a threshold, the ACK/NACK information may include an MA signature reselection command for the first MA signature. When ACK/NACK for the first MA signature is NACK and the received power level of the first DMRS is lower than the threshold, the ACK/NACK information may include an MA signature maintenance command for the first MA signature.

In each aspect of the present invention, the ACK/NACK information may include ACK/NACK for each of the plural MA signatures.

In each aspect of the present invention, when the ACK/NACK information includes the MA signature maintenance command, the ACK/NACK information may further include a redundancy version, a new data indication, a modulation and coding scheme, or power control information, which is to be used for retransmission of the uplink data.

In each aspect of the present invention, the plural MA signatures may be mapped in one-to-one correspondence to plural DMRSs.

In each aspect of the present invention, mapping information between the plural MA signatures and the plural DMRSs may be provided to the UE.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an example of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

FIG. 8 illustrates ACK/NACK information according to the present invention.

MODE FOR THE INVENTION

Figure 1:
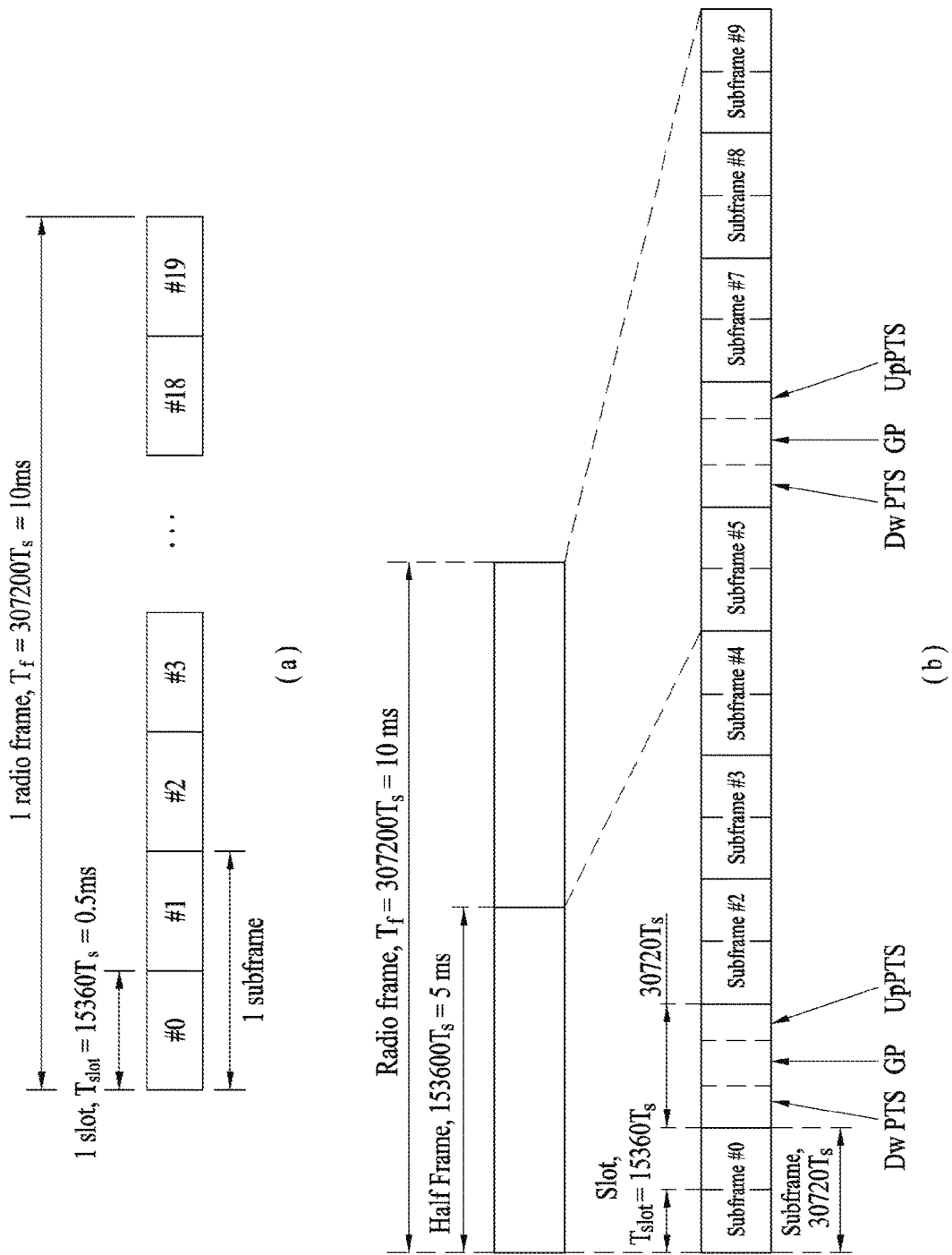
FIG. 1 illustrates the structure of a radio frame used in the LTE/LTE-A based wireless communication system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
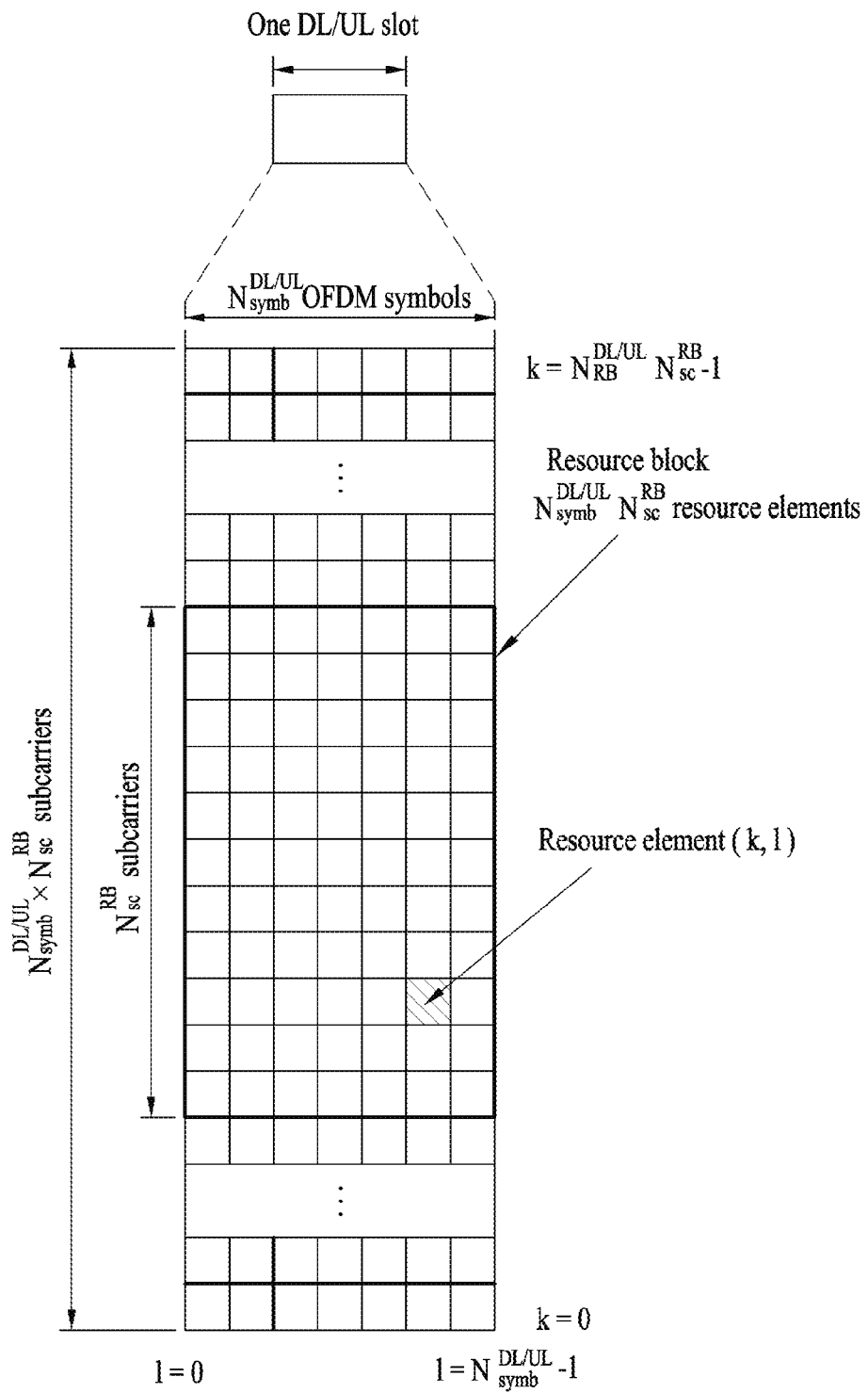
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

Figure 3:
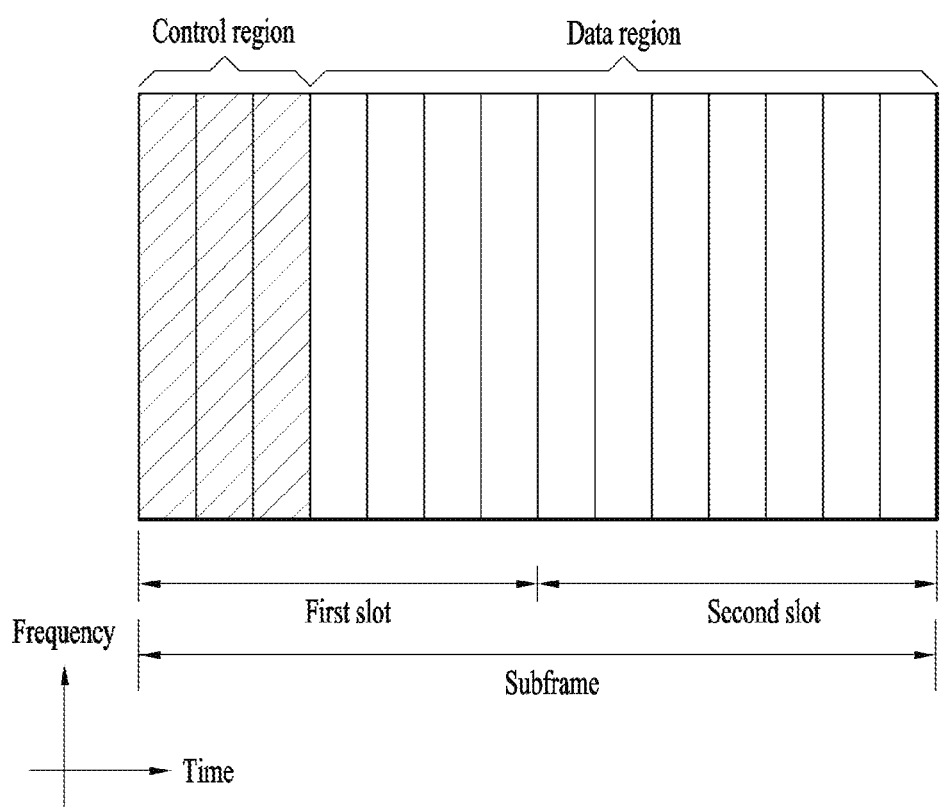
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PC-FICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. A PDCCH including n consecutive CCEs may be transmitted only on CCEs fulfilling "i mod n=0" wherein i is a CCE number.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. The set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

Figure 4:
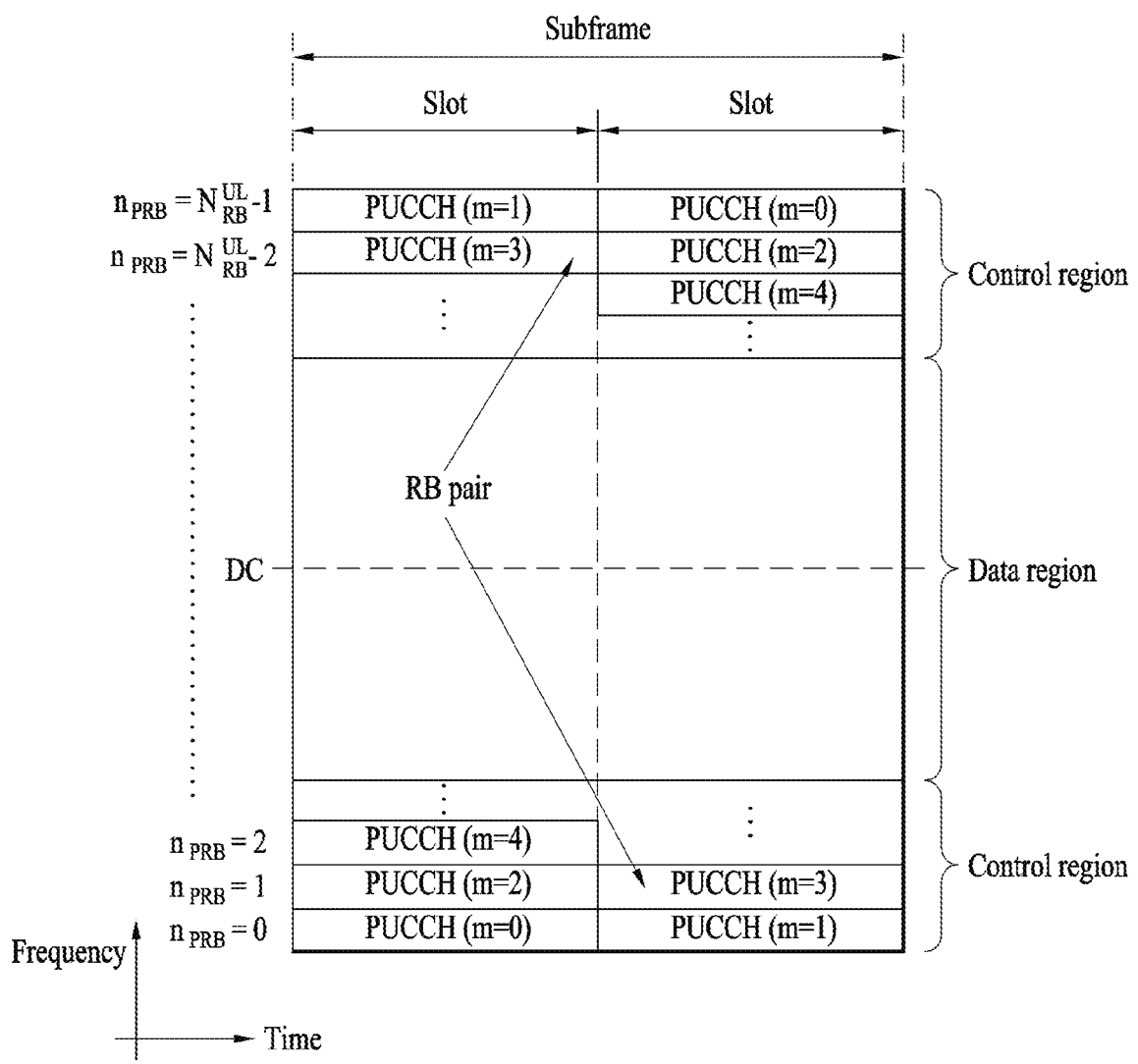
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

For PUSCH demodulation, a PUSCH DM-RS may be transmitted in a PUSCH region and, for PUCCH demodulation, a PUCCH DM-RS may be transmitted in a PUCCH region. Meanwhile, a sounding reference signal (SRS) may be allocated to the PUSCH region. The SRS is a UL RS which is not associated with PUSCH or PUCCH transmission. The SRS is transmitted in an OFDM symbol which is located at the last part of a UL subframe in the time domain and in a data transmission band of the UL subframe, that is, in the PUSCH region, in the frequency domain. The eNB may measure a UL channel state between the UE and the eNB using the SRS. SRSs of multiple UEs transmitted/received in the last OFDM symbol of the same subframe may be distinguished according to frequency position/sequence. Since the PUCCH DM-RS, the PUSCH DM-RS, and the SRS are UE-specifically generated by a specific UE and are transmitted to the eNB, these signals may be regarded as UL UE-specific RSs (hereinafter, UL UE-RSs). A UL UE-RS is defined by a cyclic shift a of a base sequence $r_{u,v}(n)$ according to a predetermined rule. For the PUCCH DM-RS, the PUSCH DM-RS, and the SRS, a plurality of base sequences are defined. For example, the base sequences may be defined using a root Zadoff-Chu sequence. The base sequences $r_{u,v}(n)$ are divided into a plurality of base sequence groups. Each base sequence group includes one or more base sequences. Among the plural base sequences, a base sequence for the UL UE-RS is determined based on a cell identifier, an index of a slot to which the UL UE-RS is mapped, and the like. The cell identifier may be a physical layer cell identifier acquired by the UE from a synchronization signal or a virtual cell identifier provided by a higher layer signal. A cyclic shift value used for cyclic shift of the base sequence is determined based on the cell identifier, a cyclic shift related value given by DCI and/or higher layers, an index of a slot to which the UL UE-RS is mapped, and the like.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
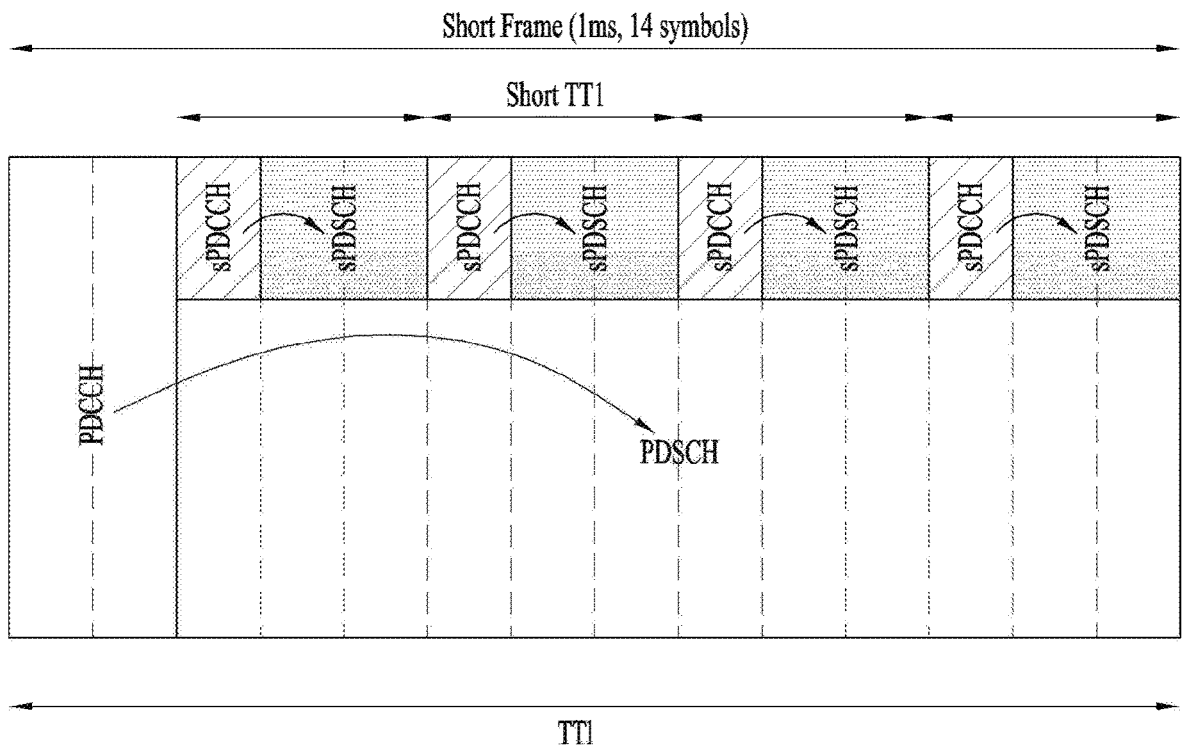
FIG. 5 illustrates an example of a short TTI and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to examples described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

In a new RAT (NR) system, a time unit in which a data channel may be scheduled may be referred to as other terms, for example, a slot, instead of a subframe. The number of slots in a radio frame of the same time length may differ according to a time length of a slot. In the present invention, the terms "subframe", "TTI", and "slot" are interchangeably used to indicate a basic time unit of scheduling.

<OFDM Numerology>

The new RAT system uses an OFDM transmission scheme or a similar transmission scheme. For example, the new RAT system may follow the OFDM parameters defined in the following table. Or although the new RAT system still uses a legacy LTE/LTE-A numerology, the new RAT system may have a wider system bandwidth (e.g., 100 MHz). Or one cell may support a plurality of numerologies. That is, UEs operating with different numerologies may co-exist within one cell.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 6:
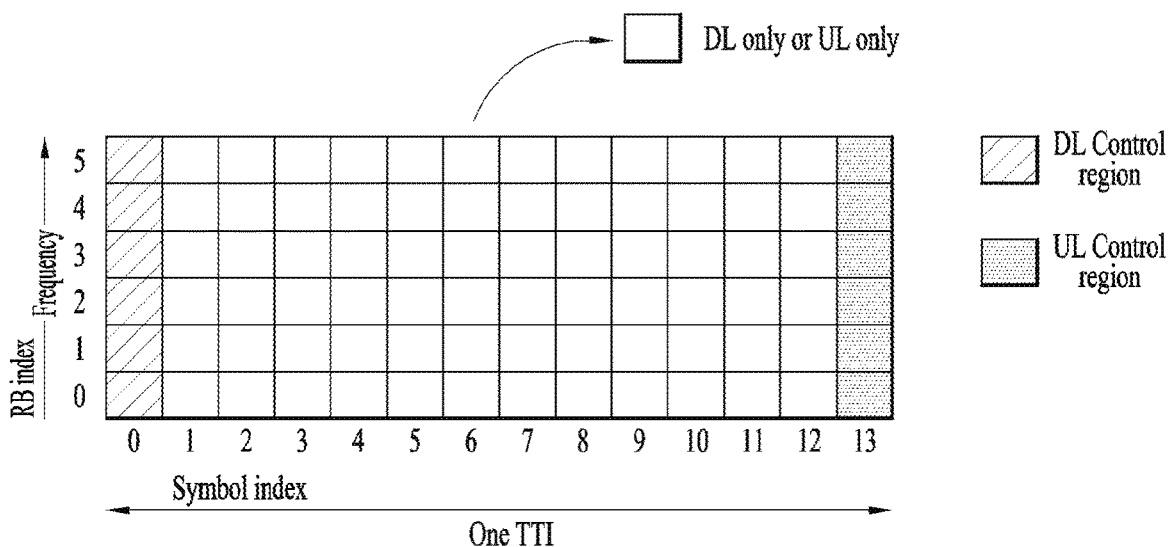
FIG. 6 illustrates a subframe structure.

FIG. 6 illustrates a new RAT (NR) subframe structure.

To minimize a data transmission delay, a subframe structure in which a control channel and a data channel are multiplexed in time division multiplexing (TDM) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 3) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

Figure 7:
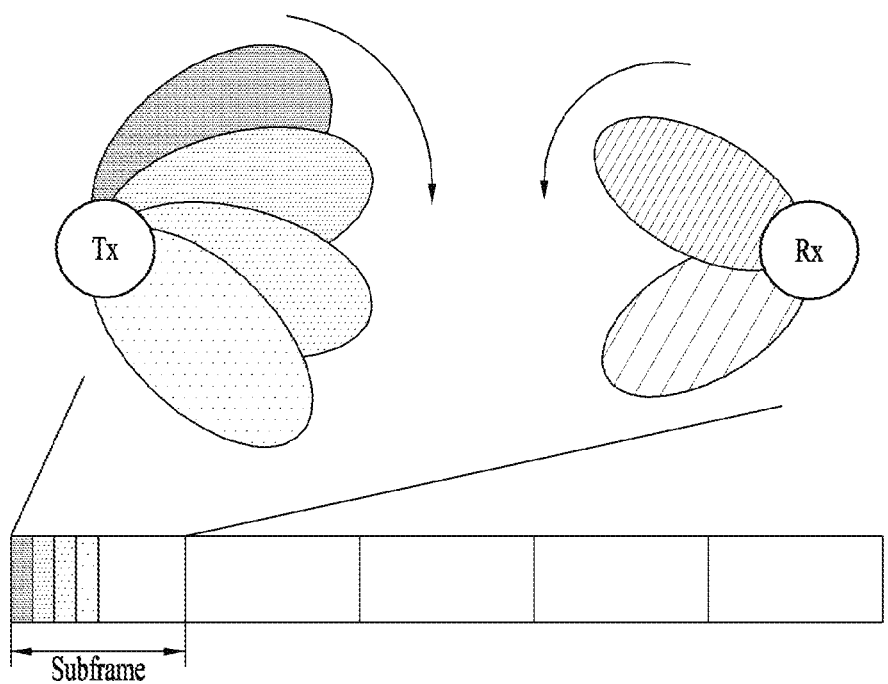
FIG. 7 illustrates an application example of analog beamforming.

FIG. 7 illustrates a transmission/reception method of a radio signal using an analog beam. Particularly, FIG. 7 illustrates a transmission/reception method of a radio signal by transmission/reception analog beam scanning.

Referring to FIG. 7, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

Introduction of next-generation radio access technology (hereinafter, NR) is under discussion in consideration of eMBB, mMTC, URLLC, and the like, as described above. The eMBB service should support higher spectral efficiency and high transmission rate. mMTC should support wide coverage and high energy efficiency while supporting services for the larger number of UEs. URLLC should support very reliable low error rate and requires low latency. Requirements of data rate of URLLC are wide in range from low data rate to very high data rate.

In a next-generation 5G system, various methods have been proposed to raise data rate, improve connectivity, or reduce latency and, particularly, a multiple access scheme capable of satisfying such requirements is needed.

The present invention proposes a grant-free based multiple access scheme as a method for satisfying such requirements. Hereinbelow, the present invention will be described focusing on UL transmission. Grant-free transmission refers to a scheme in which the UE autonomously transmits data under no dynamic control from the eNB when data that should be transmitted by the UE is generated within a specific time/frequency resource. In other words, in grant-free transmission, a resource used for transmission is preconfigured or predetermined and a transmitting device attempts to perform transmission if there is data to be transmitted thereby within the resource. A grant-free transmission scheme is a data transmission scheme based on contention between different UEs because the eNB is not directly involved in scheduling. In the present invention, grant-free is used as the term indicating grant-free/autonomous/contention-based transmission scheme. A representative system of the contention-based MA scheme may be, for example, a Wi-Fi system. A scheme of applying carrier sensing and random backoff in a state in which contention-based transmission is performed may be included in the grant-free transmission scheme.

A grant-free based multiple access scheme may be performed only after resources available for grant-free based multiple access are allocated to the UE after the UE performs initial access. The resources available for grant-free based multiple access are as follows. A multiple access (MA) resource is determined by a combination of an MA physical resource and an MA signature.

MA physical resource: Time/frequency resource on which grant-free based MA can be performed.
  Time resource: A the time resource may be signaled by a specific time duration and a time interval. If only the time resource is signaled, the UE may perform grant-free based MA in an entire system band, a maximum band limited by the capability of the UE, or a frequency band limited by a specific use case or service.
  Frequency resource: A specific frequency unit or subband, RBs, or RB indexes may be signaled as the frequency resource. If only the frequency resource is signaled, the UE may perform a grant-free based operation at any time within the corresponding frequency resource.
  Resource configured by a combination of time and frequency: A resource configured by a combination of the time resource and the frequency resource. If the time resource and the frequency resource are signaled, the UE may perform grant-free based MA only within a designated time resource and frequency resource.

MA signature pool: An MA signature pool or a plurality of MA signatures, used to distinguish between UEs or data, when grant-free based MA is performed.

An MA signature is a resource used to distinguish between UEs and may include a time and/or frequency resource, codes, codebook(s), sequences, interleaver or interleaver patterns, and a spatial domain resource, which are defined as a subset of the above-described MA physical resource. A signature used for multi-user detection (MUD) in one system may be configured by a combination of one of the above-mentioned signature candidates or a combination of one or more thereof. For convenience of description of the present invention, it is assumed that one type of signature is used in one system.

Although the UE selects one signature at a data transmission timing, a plurality of signatures should be allocated to the UE so as to enable the UE to operate in a grant-free mode. Hereinafter, a plurality of signatures allocated to the UE is referred to as a signature pool.

MA DM-RS resource pool: The MA DM-RS resource pool is used by the eNB to perform channel estimation for data transmitted by an arbitrary UE when grant-free based MA is performed. To distinguish between UEs or data, a DM-RS resource (e.g., an OFDM/SC-FDM symbol or a DM-RS sequence) may be used together with the MA signature.

The present invention proposes an ACK/NACK transmission method in contention-based MA. If the number of MA signature candidates available on a specific MA physical resource (e.g., a time-frequency resource) is N, ACK/NACK for each of N indexes may be signaled at every timing. For example, N ACK/NACK signals may be transmitted at every ACK/NACK transmission timing.

For ACK, the eNB may transmit a UE ID or UE ID related information together with ACK and, for NACK, the eNB may command the UE to perform retransmission by reselecting an MA signature or maintaining the MA signature. This is because, if ACK/NACK for UL data is ACK, this means that the UL data has been successfully decoded so that the eNB is aware of which UE has transmitted the UL data but, if ACK/NACK for the UL data is NACK, the eNB is not aware of which UE has transmitted the UL data so that it is difficult to specify a UE that has transmitted target UL data of NACK when transmitting NACK.

In contention-based UL transmission, the reason why NACK occurs is due to collision and lack of energy. Therefore, if the reason why NACK occurs is discerned by the eNB, a solution to the reason may be found. The eNB may primarily discern to some degree the reason why NACK for UL data occurs by utilizing the received power of a DM-RS. In consideration of system complexity, when an MA DM-RS resource pool and an MA signature pool are present, the present invention assumes the case in which a specific DM-RS resource is mapped in one-to-one correspondence to a specific MA signature. That is, it is assumed in the following description that DM-RS resources (e.g., a sequence, a cyclic shift, a root index, etc.) and MA signatures are paired, respectively.

In the case in which one or more UEs have transmitted UL signals using the same DM-RS/MA signature and then the eNB has decoded only a UL signal of a specific UE due to a difference in received power, if the eNB transmits ACK for the DM-RS/MA signature without information regarding the UEs, other UEs, that have transmitted data at low power so that the eNB has failed to receive the data thereof, may misunderstand ACK transmitted by the eNB as ACK for the data transmitted by other UEs. To prevent this phenomenon, the eNB may also transmit a UE ID or information corresponding to the UE ID when signaling ACK.

In one system, a plurality of MA physical resources may be present. A plurality of MA physical resources may be configured and the maximum number Nmax_ue of UEs that can access on each of the MA physical resources may be separately limited. Alternatively, Nmax_ue may have a value common to all MA physical resources. If a plurality of UEs accesses an MA physical resource without control or grant of the eNB, since it is difficult for the eNB to specify a UE, each UE may transmit a UE ID thereof as well when transmitting data. However, since the UE ID may act as overhead and the eNB should attempt to perform blind detection for numerous UE IDs (e.g., $10^6$/km$^2$), complexity of a reception end and reception latency is increased. Therefore, in order to prevent an increase in complexity of the reception end and reception latency, the eNB may assign a temporary UE ID capable of being used on a corresponding MA physical resource with respect to each MA physical resource upon configuring MA physical resources for the UE. For example, if the maximum number of UEs capable of accessing a specific MA physical resource is limited to 64, the eNB may assign a temporary UE ID of a 6-bit length to one UE. That is, in order to enable MA before the UE attempts to perform contention-based/grant-free MA, a system may allocate a specific MA physical resource to the UE and assign a temporary UE ID of the UE that can be used on the specific MA physical resource, upon configuring MA related information for the UE. The system also transmits a DM-RS resource pool, an MA signature pool, and a pairing relationship between a DM-RS resource and an MA signature. A plurality of MA physical resources may be configured for one UE. In this case, the temporary UE ID may differ per MA physical resource. Similarly, the DM-RS resource pool, the MA signature pool, and the pairing relationship between the DM-RS resource and the MA signature may differ per MA physical resource. An MA signature candidate and the number of MA signature candidates capable of being used per MA physical resource may also differ.

Upon performing contention/grant-free based UL transmission, the UE may transmit a temporary UE ID as well when transmitting data thereof or scramble the data thereof using the temporary UE ID to transmit the data thereof.

DL ACK/NACK for UL data may be transmitted for all MA signatures available on MA physical resources with respect to each MA physical resource. To this end, a DL ACK/NACK resource per MA physical resource needs to be designated. UEs should be previously informed of information about the DL ACK/NACK resource per MA physical resource. The maximum number Nmax_signature of MA signatures available per MA physical resource should be pre-reserved. The length of an ACK/NACK signal is determined by the maximum number of MA signatures available on one MA physical resource. In the present invention, ACK/NACK transmission per MA signature means that ACK/NACK is transmitted per MA signature index or DM-RS index.

FIG. 8 illustrates ACK/NACK information according to the present invention. Particularly, FIG. 8 illustrates the concept of ACK/NACK signaling per MA signature index when Nmax_signature=8.

Generally, in contention/grant-free based UL transmission which is not based on scheduling, it is difficult to specify which UE has transmitted data. In particular, when the eNB has successfully decoded the data, it is not difficult for the eNB to specify a UE that has transmitted data received on an MA physical resource. However, when the eNB has not successfully decoded UL data, it is difficult for the eNB to specify a UE that has transmitted UL data received on a corresponding MA physical resource. Although a scheme of simply performing repeated transmission by the UE without ACK/NACK signaling may be considered, ACK/NACK signaling may also be applied to contention/grant-free based UL transmission in order to prevent unnecessary transmission and raise resource efficiency and to gain advantages of HARQ combining.

The biggest reason why the reception end fails to decode data is generally due to lack of energy. However, the reason why the reception end fails to decode data transmitted based on contention is due to lack of received energy and collision caused by contention. Particularly, the reception end may fail to decode data by failing to distinguish between different data due to use of the same time/frequency resource and use of the same signature. A solution method may differ according to the cause of data decoding failure. If the cause of data decoding failure is lack of energy, the reception end may command a transmitting end to perform retransmission and raise transmission power and succeed in decoding data by combining the data with previously received data. If the cause of data decoding failure is signature collision, the reception end should cause transmitting ends to transmit data using different signatures in order to avoid collision.

Therefore, an ACK/NACK transmission method considering the above description is described in the following table.

TABLE 1

| Channel estimation using DM-RS | Data decoding | | ACK/NACK transmission |
|---|---|---|---|
| Success | Success | | (1) ACK (If UEs transmit ID information thereof, the UEs are distinguished.) When two UEs perform UL transmission using the same DM-RS, the eNB may successfully decode data of a UE transmitted with high power but fail to decode data of a UE transmitted with low power. In this case, the eNB informs a UE of a target UE ID of ACK when transmitting ACK, so that a UE having a UE ID which does not match the target UE ID of ACK confirms that data that the UE has transmitted has not been successfully received by the eNB and/or attempts to perform retransmission, even though the UE has performed UL transmission using a corresponding DM-RS/signature. |
| | Failure | Due to collision | (2) NACK - MA signature reselection command When two UEs transmit data using the same DM-RS through similar power control, if the eNB has successfully performed channel estimation using the DM-RS but has failed to decode the data (e.g., if the received power of the DM-RS is a predetermined level or higher), the eNB transmits NACK signaling and an MA signature reselection command for a corresponding MA signature. In this case, the eNB does not perform HARQ combining. |
| | | Due to lack of energy | (3) NACK - Retransmission for maintaining the MA signature When a received power level of the DM-RS is low, if the eNB has successfully performed channel estimation but has failed to decode the data, the eNB may determine that decoding has failed due to lack of energy. The eNB may transmit NACK signaling and a signature maintenance command. HARQ combining for the same signature may be performed. The eNB and/or the UE may transmit an RV or an NDI. |
| Failure | Failure | Due to collision or lack of energy | (4) NACK - for all MA signatures The eNB performs NACK signaling for an MA signature index in which the eNB has failed to decode or detect the data. |

In a contention/grant-free based scheme, a plurality of s may access the same MA physical resource and MA signatures used by respective UEs may be identical or different. In the present invention, pairing between an MD-RS and an MA signature is assumed as a method of reducing blind detection complexity at the reception end. Channel estimation performance and data decoding performance using the DM-RS, which is a pre-reserved sequence between the transmission end and the reception end, may differ. For example, even if the reception end has successfully performed channel estimation using the DM-RS, the reception end may fail to decode data. Generally, the main reason why the reception end fails to decode data is due to lack of energy or a high interference level. However, in the contention/grant-free based MA scheme, when a plurality of UEs transmits data using the same signature, i.e., even when signature collision occurs, the reception end may fail to decode data. If decoding failure is due to lack of received energy, the reception end may command the transmission end to raise transmitted power for transmission or the reception end may combine retransmitted data, thereby improving reception performance. However, if the reception end fails to decode data due to signature collision, the reception end may command the transmission end to perform signature reselection, so that signature collision can be avoided in subsequent retransmission by transmission ends.

When the reception end has successfully performed channel estimation using the DM-RS but has failed to decode data, if the reception end can be aware of the reason for decoding failure, the reception end may transmit a response to the UE as mentioned above so that data reception performance in the contention/grant-free based MA scheme can be improved.

Case 1. If the eNB has performed channel estimation and succeeded in performing data decoding, this case corresponds to (1) of Table 1. Upon transmitting ACK for a signature detected by the eNB, the eNB transmits UE ID related information, for example, a temporary UE ID, together with ACK signaling. The reason why the UE ID related information is transmitted when ACK signaling is performed is that there is the case in which the eNB fails to detect data because a received power level is low although other UEs have attempted to transmit UL data using the same signature. Even if the UE has received ACK signaling for a corresponding signature after transmitting UL data using an MA signature, the UE may recognize ACK signaling as ACK if ACK signaling matches a temporary UE ID thereof. However, if ACK signaling does not match the temporary UE ID of the UE, the UE may determine that the eNB has not successfully received UL data that the UE has transmitted and attempt to perform retransmission. In this case, the UE may maintain a used MA signature or newly select the MA signature for transmission. Since the UE has recognized that the eNB has not successfully received the UL data that the UE has transmitted, the UE may not consider UL data that the eNB has failed to receive upon selecting an RV. For example, if the UE has received ACK for an MA signature used during initial transmission of UL data but a temporary UE ID of ACK does not match a temporary UE ID of the UE, the UE may set an NDI such that the NDI indicates new data transmission, rather than retransmission, during retransmission of the UL data and transmit data having RV=0 to indicate that the data is first transmitted data. As another example, if the UE has received NACK for first transmitted data and ACK for an MA signature used for second transmission of the data (RV=1 and the NDI is not set) but a UE ID of ACK does not match a temporary UE ID of the UE, the UE does not update the RV (RV=1 and the NDI is not set) for retransmission upon performing retransmission of the data. Herein, "the NDI is not set" may indicate that an NDI value during previous transmission is not toggled.

Case 2. When the reception end has succeeded in performing channel estimation using a DM-RS but has failed to decode data, particularly, when DM-RS reception performance is above a predetermined threshold, a possibility that different UEs have transmitted data using the same DM-RS/MA signature may be high. In this case, the eNB may regard the cause of NACK, i.e., the cause of data decoding failure, as collision between MA signatures. Therefore, when this phenomenon occurs, the eNB may transmit a NACK signal for an MA signature index paired with a corresponding DM-RS index and command UE(s) to perform retransmission after reselecting an MA signature. Upon receiving NACK signaling and an MA signature reselection command for an MA signature selected by the UE, the UE attempts to retransmission by newly selecting the MA signature. In this case, the reception end, for example, the eNB, does not perform HARQ combining for data transmission using different MA signatures and the UE also expects that the reception end will not perform HARQ combining for UL data. If the reception end desires to transmit a power control command to UE(s), the reception end may transmit a command for ramping down power or a command for maintaining a transmitted power level.

Case 3. If the reception end has succeeded in performing channel estimation using a DM-RS but has failed to decode data, particularly, when DM-RS reception performance is below a predetermined threshold, this case corresponds to (3) of Table 1 and the cause of data decoding failure may be lack of received energy. Therefore, if the reception end has succeeded in performing channel estimation using the DM-RS but has failed data decoding, particularly, if DM-RS reception performance is below the predetermined threshold, the reception end may regard the cause of decoding failure as lack of energy. Accordingly, the eNB may transmit a NACK signal for an MA signature index paired with a corresponding DM-RS index and command the UE to perform retransmission for the MA signature index. In this case, unless additional signaling is given, the UE does not perform reselection for the MA signature and maintains a previously used MA signature index. The reception end may additionally transmit a command for ramping up transmitted power and a command for raising or lowering an MCS. The eNB may perform HARQ combining for data transmitted using the same signature and transmit RV or NDI information and MCS information, which are to be transmitted later, for a corresponding MA signature, upon transmitting the NACK signal. For accurate understanding between the UE and the eNB, the UE may also transmit RV, NDI, and MCS information for data transmitted thereby (when values different from RV, NDI, and MCS information indicated by the eNB are used) upon transmitting data.

Case 4. If the reception end has not succeeded in performing channel estimation using a DM-RS, it is apparent that the reception end will fail to perform subsequent data decoding. In this case, the reception end may command the UE to reselect an MA signature while transmitting discontinuous transmission (DTX) or NACK signaling for all MA signature indexes that do not correspond to Cases 1, 2, and 3 described above.

Figure 9:
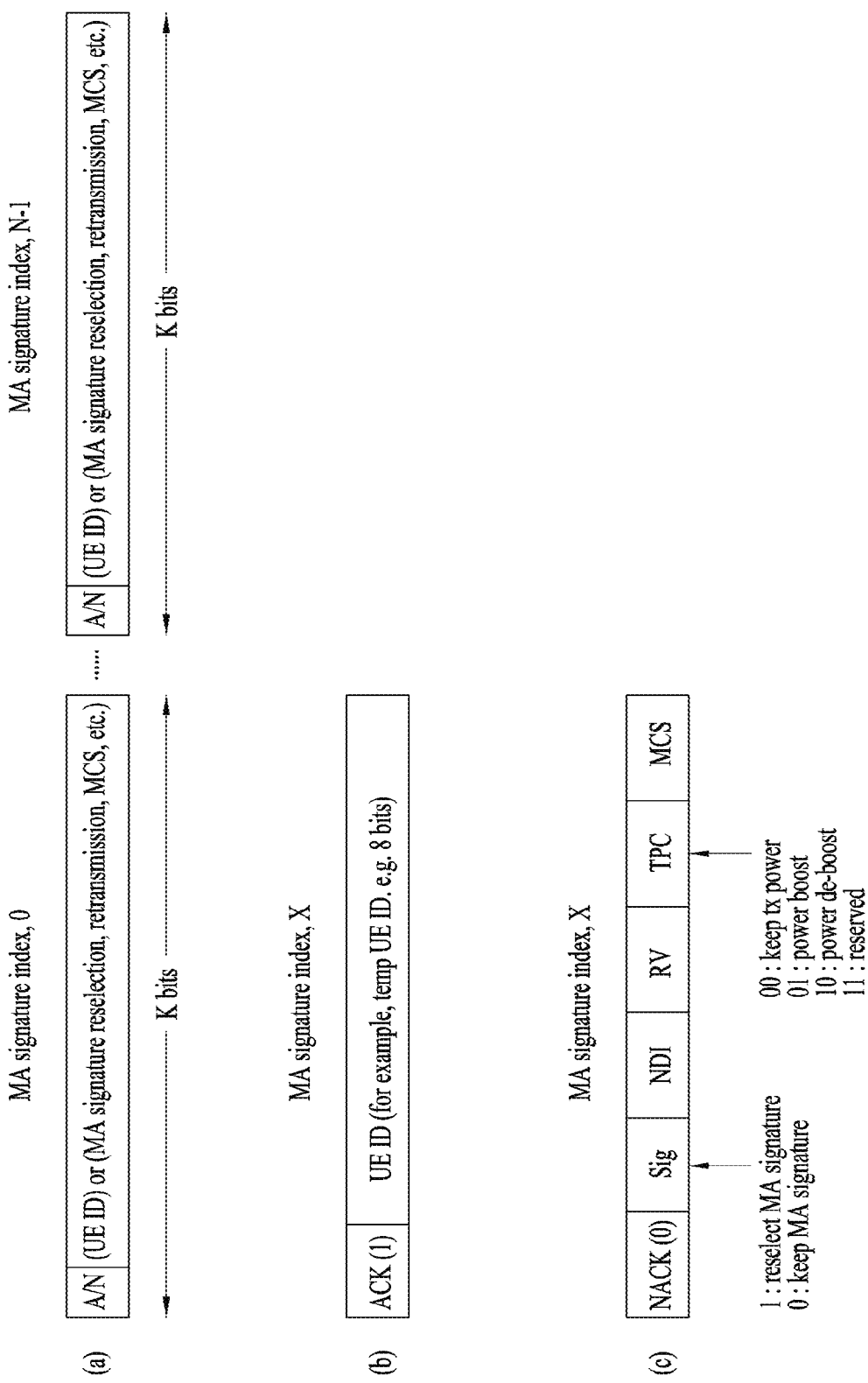
FIG. 9 illustrates an ACK/NACK signaling method according to the present invention.

FIG. 9 illustrates an ACK/NACK signaling method according to the present invention. Hereinafter, an ACK/NACK signaling method per MA signature, proposed in the present invention, will be described in more detail. In particular, FIG. 9(a) illustrates an ACK/NACK signaling format, FIG. 9(b) illustrates an ACK signaling format for a specific MA signature, and FIG. 9(c) illustrates a NACK signaling format for a specific MA signature.

Referring to FIG. 9(a), ACK/NACK may be signaled with each of the number, N, of MA signatures available on a specific MA physical resource. The value of N may differ according to an MA physical resource.

Referring to FIG. 9(b), when a reception end signals ACK for a specific MA signature, the reception end may transmit, together with an ACK signal for the specific MA signature, UE ID information of a UE that has transmitted UL data, which is a target of the ACK signal.

Referring to FIG. 9(c), when the reception end signals NACK for a specific MA signature, the reception end may transmit, together with a NACK signal, signature reselection command, NDI, RV, MCS, and/or TPC related information, instead of a UE ID.

Figure 10:
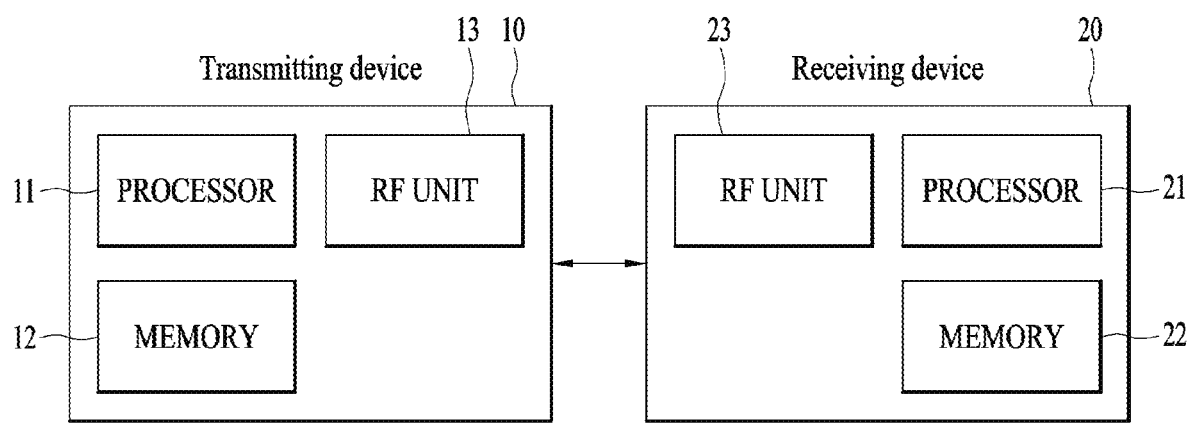
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor according to the present invention may perform channel estimation using a DM-RS received on a physical MA resource and attempt to decode a UL signal received on the physical MA resource. The eNB processor may control the eNB RF unit to perform ACK/NACK transmission for each MA signature according to Table 1.

The UE processor according to the present invention may control the UE RF unit to transmit UL data using one of MA signatures available on the physical MA resource. The UE processor may control the UE RF unit to transmit a DM-RS corresponding to a corresponding MA signature together with the UL data. The UE processor may control the UE RF unit to receive an ACK/NACK signal for the MA signature. The UE processor may interpret ACK/NACK information according to Table 1 and control the UE RF unit to transmit new UL data or perform retransmission of UL data.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a base station, a user equipment, or other devices in a wireless communication system.

The invention claimed is:

1. A method of transmitting an uplink signal by a user equipment (UE) in a wireless communication system, the method comprising:
    transmitting uplink data, and a first demodulation reference signal (DMRS) corresponding to a first multiple access (MA) signature, using the first MA signature among a plurality of MA signatures available on a physical MA resource, based on at least one of a first modulation and coding scheme (MCS) or a first transmission power;
    receiving acknowledgement (ACK)/negative ACK (NACK) information including an ACK/NACK for the first MA signature; and
    based on the ACK/NACK for the first MA signature being a NACK, performing a retransmission of the uplink data,
    wherein, based on the ACK/NACK for first MA signature being the NACK, the ACK/NACK information includes an MA signature reselection or maintenance command,
    wherein, based on the ACK/NACK information including the MA signature maintenance command, the retransmission of the uplink data uses the first MA signature and the first DMRS and, the ACK/NACK information further includes at least one of updated MCS information or updated power control information,
    wherein the updated MCS information indicates a second MCS, lower than the first MCS, to be applied to the retransmission,
    wherein the updated power control information indicates a second transmission power, higher than the first transmission power, to be applied to the retransmission, and
    wherein, based on the ACK/NACK information including the MA signature reselection command, the retransmission of the uplink data uses a second MA signature different from the first MA signature and a second DMRS corresponding to the second MA signature.

2. The method of claim 1, wherein the ACK/NACK information further includes an ACK/NACK for each of the plural MA signatures.

3. The method of claim 1, wherein, based on the ACK/NACK information including the MA signature maintenance command, the ACK/NACK information further includes at least one of a redundancy version, or a new data indication, which is to be used for the retransmission of the uplink data.

4. The method of claim 1, wherein the plural MA signatures are mapped in one-to-one correspondence to plural DMRSs.

5. The method of claim 4, further comprising:
    receiving mapping information between the plural MA signatures and the plural DMRSs.

6. A method of receiving an uplink signal by a base station (BS) in a wireless communication system, the method comprising:
    receiving uplink data and a first demodulation reference signal (DMRS) on a physical multiple access (MA) resource, based on at least one of a first modulation and coding scheme (MCS) or a first transmission power;
    attempting to decode the uplink data using the first DMRS;
    upon failing to decode the uplink data, transmitting acknowledgement (ACK)/negative ACK (NACK) information including an ACK/NACK for a first MA signature, corresponding to the first DMRS, among a plurality of MA signatures; and
    based on the ACK/NACK for the first MA signature being a NACK, receiving a retransmission of the uplink data,
    wherein, based on the ACK/NACK for the first MA signature being the NACK and a received power level of the first DMRS being equal to or higher than a threshold, the ACK/NACK information includes an MA signature reselection command for the first MA signature,
    wherein, based on the ACK/NACK for the first MA signature is-being the NACK and the received power level of the first DMRS being lower than the threshold, the ACK/NACK information includes an MA signature maintenance command for the first MA signature, and the ACK/NACK information further includes at least one of updated MCS information or updated power control information,
    wherein the updated MCS information indicates a second MCS, lower than the first MCS, to be applied to the retransmission, and
    wherein the updated power control information indicates a second transmission power, higher than the first transmission power, to be applied to the retransmission.

7. The method of claim 6, wherein the ACK/NACK information further includes an ACK/NACK for each of the plural MA signatures.

8. The method of claim 6, wherein, based on the ACK/NACK information including the MA signature maintenance command, the ACK/NACK information further includes at least one of a redundancy version, or a new data indication, which is to be used for the retransmission of the uplink data.

9. The method of claim 6, wherein the plural MA signatures are mapped in one-to-one correspondence to plural DMRSs.

10. The method of claim 9, further comprising transmitting mapping information between the plural MA signatures and the plural DMRSs.

11. A user equipment (UE) for transmitting an uplink signal in a wireless communication system, the UE comprising,
    a radio frequency (RF) transceiver, and
    a processor configured to control the RF transceiver, the processor configured to:
    control the RF transceiver to transmit uplink data, and a first demodulation reference signal (DMRS) corresponding to a first multiple access (MA) signature, using the first MA signature among a plurality of MA signatures available on a physical MA resource, based on at least one of a first modulation and coding scheme (MCS) or a first transmission power;
    control the RF transceiver to receive acknowledgement (ACK)/negative ACK (NACK) information including an ACK/NACK for the first MA signature; and
    control the RF transceiver to perform a retransmission of the uplink data based on the ACK/NACK for the first MA signature being a NACK, and
    wherein, based on ACK/NACK for first MA signature is-being the NACK, the ACK/NACK information includes an MA signature reselection or maintenance command, wherein, based on the ACK/NACK information including the MA signature maintenance command, the retransmission of the uplink data uses the first MA signature and the first DMRS, and the ACK/NACK information further includes at least one of updated MCS information or updated power control information, wherein the updated MCS information indicates a second MCS, lower than the first MCS, to be applied to the retransmission, wherein the updated power control information indicates a second transmission power, higher than the first transmission power, to be applied to the retransmission, and wherein, based on the ACK/NACK information including the MA signature reselection command, the retransmission of the uplink data uses a second MA signature different from the first MA signature and a second DMRS corresponding to the second MA signature.

12. The UE of claim 11, wherein the ACK/NACK information further includes an ACK/NACK for each of the plural MA signatures.

13. The UE of claim 11, wherein, based on the ACK/NACK information including the MA signature maintenance command, the ACK/NACK information further includes at least one of a redundancy version, or a new data indication, which is to be used for the retransmission of the uplink data.

14. The UE of claim 11, wherein the plural MA signatures are mapped in one-to-one correspondence to plural DMRSs.

15. The UE of claim 14, wherein the processor is configured to control the RF transceiver to receive mapping information between the plural MA signatures and the plural DMRSs.

16. A base station (BS) for receiving an uplink signal in a wireless communication system, the BS comprising,
a radio frequency (RF) transceiver, and
a processor configured to control the RF transceiver, the processor configured to:
control the RF transceiver to receive uplink data and a first demodulation reference signal (DMRS) on a physical multiple access (MA) resource, based on at least one of a first modulation and coding scheme (MCS) or a first transmission power;
attempt to decode the uplink data using the first DMRS;
upon failing to decode the uplink data, control the RF transceiver to transmit acknowledgement (ACK)/negative ACK (NACK) information including ACK/NACK for a first MA signature, corresponding to the first DMRS, among a plurality of MA signatures;
based on ACK/NACK for the first MA signature being a NACK, receiving a retransmission of the uplink data,
wherein, based on ACK/NACK for the first MA signature being the NACK and a received power level of the first DMRS being equal to or higher than a threshold, the ACK/NACK information includes an MA signature reselection command for the first MA signature,
wherein, based on ACK/NACK for the first MA signature being the NACK and the received power level of the first DMRS being lower than the threshold, the ACK/NACK information includes an MA signature maintenance command for the first MA signature, and the ACK/NACK information further includes at least one of updated MCS information or updated power control information,
wherein the updated MCS information indicates a second MCS, lower than the first MCS, to be applied to the retransmission, and
wherein the updated power control information indicates a second transmission power, higher than the first transmission power, to be applied to the retransmission.

17. The BS of claim 16, wherein the ACK/NACK information further includes an ACK/NACK for each of the plural MA signatures.

18. The BS of claim 16, wherein, based on the ACK/NACK information including the MA signature maintenance command, the ACK/NACK information further includes at least one of a redundancy version, or a new data indication, which is to be used for the retransmission of the uplink data.

19. The BS of claim 16, wherein the plural MA signatures are mapped in one-to-one correspondence to plural DMRSs.

20. The BS of claim 19, wherein the processor is configured to control the RF transceiver to transmit mapping information between the plural MA signatures and the plural DMRSs.

* * * * *